(12) United States Patent
Rodgers et al.

(10) Patent No.: US 6,793,019 B2
(45) Date of Patent: Sep. 21, 2004

(54) TAPERED RAMP POSITIVE LOCK LATCH MECHANISM

(75) Inventors: Tony Alan Rodgers, Houston, TX (US); Robert Duane Fross, Houston, TX (US)

(73) Assignee: ABB Offshore Systems, Inc., Houston, TX (US)

( * ) Notice: Subject to any disclaimer, the term of this patent is extended or adjusted under 35 U.S.C. 154(b) by 87 days.

(21) Appl. No.: 10/192,203

(22) Filed: Jul. 10, 2002

(65) Prior Publication Data

US 2004/0007362 A1 Jan. 15, 2004

(51) Int. Cl.$^7$ .............................................. E21B 29/12
(52) U.S. Cl. ........................ 166/344; 166/368; 166/340; 166/345
(58) Field of Search ................................ 166/344, 365, 166/368, 340, 345, 359

(56) References Cited

U.S. PATENT DOCUMENTS

| | | | | |
|---|---|---|---|---|
| 4,902,044 A | * | 2/1990 | Williams et al. | 285/18 |
| 4,984,830 A | * | 1/1991 | Saunders | 285/368 |
| 5,105,888 A | * | 4/1992 | Pollock et al. | 166/348 |
| 5,141,053 A | * | 8/1992 | Restarick et al. | 166/120 |
| 5,163,514 A | * | 11/1992 | Jennings | 166/368 |
| 5,535,827 A | * | 7/1996 | Graff et al. | 166/368 |
| 5,542,475 A | * | 8/1996 | Turner et al. | 166/387 |
| 5,950,997 A | * | 9/1999 | Metz | 267/255 |
| 6,540,024 B2 | * | 4/2003 | Pallini et al. | 166/348 |
| 6,595,293 B2 | * | 7/2003 | Carter | 166/345 |

* cited by examiner

Primary Examiner—Thomas B. Will
Assistant Examiner—Thomas A Beach
(74) Attorney, Agent, or Firm—Bracewell & Patterson, L.L.P.

(57) ABSTRACT

A tool lands a flowline connector on a base and soft land the connector to a mandrel. After the tool lands on the base, the tool locks to the base and then pushes the connector the mandrel until it abuts locks to the member. The tool has at least one ring assembly with a number of dogs per ring assembly. Each dog moves in unison with a follower relative to a cam ring in a slot. The movement along the slot moves the dogs radially and circumferentially relative to the cam ring. An actuator moves a follower ring that slides relative to the cam ring which moves the follower. Each dog remains in contact with the cam ring after moving radially inward because of protuberances on each dog that slide from a recess as the dog moves circumferentially and radially inward.

21 Claims, 7 Drawing Sheets

TAPERED RAMP POSITIVE LOCK LATCH MECHANISM

BACKGROUND OF THE INVENTION

1. Field of the Invention

The present invention relates generally to subsea well installations, more specifically, to a tool used for connecting a flowline apparatus to a subsea well installation.

2. Background of the Prior Art

Different structures are placed on or buried in the seabed for subsea oil and gas production operations. The base structures have mandrels or tubular members to connect to flowlines. Flowlines connect these structures and are typically installed after the structures were placed at the seabed. The lines or piping systems with connectors at the ends are lowered to the seabed for installation via wire rope guidelines or other running strings such as pipe. The connectors are consequently hard landed on either the subsea mandrel or support structures, and with the aide of tools and remote operated vehicles (ROV), are locked to the tubular members. The tubular members are typically vertical so the flowline connectors lower down on top of them, but the mandrels can be horizontal. If the connector assemblies are landed fast or too hard on the tubular members such that the landing force is not controlled, damage to the hubs and seals can occur.

Flowline connector assemblies are normally run subsea and landed over the tubular members with funnel up, funnel down, or frame and tool assemblies. Prior art assemblies required the ROV to perform numerous operations in order to engage locking members from the remotely run frame to the subsea base structure. Earlier assemblies also required the ROV to perform numerous operations to engage locking members on the flowline connector, even after the frame has been secured to the subsea support structure.

Later assemblies have a frame holding the connector spaced above the tubular member when the frame lands on the structure. The frame hard lands on the structure to bear most of the landing forces and aligns the connector with the tubular member. The frame then lowers the connector until it abuts the tubular member or soft lands on the tubular member. In these assemblies, the frames were either mounted to the connector or the frames were removeable. The removeable frames used dogs to engage the connector.

When dogs were used, hydraulic pressure held the dogs in substantial contact with the connector. In the event of hydraulic pressure failure, a mechanical back-up was necessary. Many times the hydraulic systems would fail. The back-up systems had to be actuated with ROVs, which cost the operator time and money. Furthermore, whenever a hydraulic system failed, the entire frame would have to be lifted to the surface for repairs, which also accounted for losses of production time and money.

BRIEF SUMMARY OF THE INVENTION

The tool in this invention uses at least one ring assembly to hold the connector that it is attaching to the mandrel or tubular member. The each ring assembly includes at least one dog that is moved between radially inward and outward positions. The dog is positioned within a cam ring that partially surrounds the connector. When the dog is moved radially inward, the dog is in its gripping position to hold a connector. Each dog has a cam pin or follower running therethrough. The follower also extends through a cam slot on the cam ring. When the follower moves relative to the cam ring, it can only move along the cam slot. The dog cannot move relative to the follower, so the dog moves in unison with the follower along the path allowed by the cam slot.

The cam slot has a radial inner portion and a radial outer portion, so the follower and the dog move radially inward and radially outward along the cam slot. The ring assembly also includes a cam follower ring that engagingly slides relative to the cam ring. A portion of the follower engages the cam follower ring. The follower can only move radially with respect to cam follower ring, therefore relative circumferential movement between the cam ring and the cam follower ring is in unison between the cam follower ring, the follower, and each dog. The cam ring can be moved relative to the cam follower ring, which forces the follower to move radially inward or outward as cam slot moves around the follower. Therefore the dogs can be opened or closed by moving the cam ring.

Each dog includes at least one protrusion or protuberance on its outer circumference. When each dog is radially outward, the protuberance fits into a recess formed in the cam ring so that both the protuberance and the outer circumference of each dog is in substantial contact with the cam ring. As each dog moves radially inward the dog also moves circumferentially relative to the cam ring. The combination of the radial and circumferential movement of the dog relative to the cam ring moves the dog so that the protuberance is positioned where the outer circumference of the dog had been positioned rather than against a recess. A gap is formed between the outer circumference of the dog and the cam ring because the protuberance extends beyond the outer circumference of the dog to the cam ring. The protuberance remains in substantial contact with the cam ring. Thus, any radially forces from the inner circumference of the dog are absorbed by the cam ring. No hydraulic pressure is needed to keep the dogs in their closed position, and there is no need for a mechanical back-up because the cam ring is a physical barrier to outward movement of each of the dogs.

BRIEF DESCRIPTION OF THE DRAWINGS

FIG. 8a is an enlarged cross-section view of the ring assembly of FIG. 7a taken along line 8a—8a of FIG. 7a.

DETAILED DESCRIPTION OF THE PREFERRED EMBODIMENT

Figure 1:
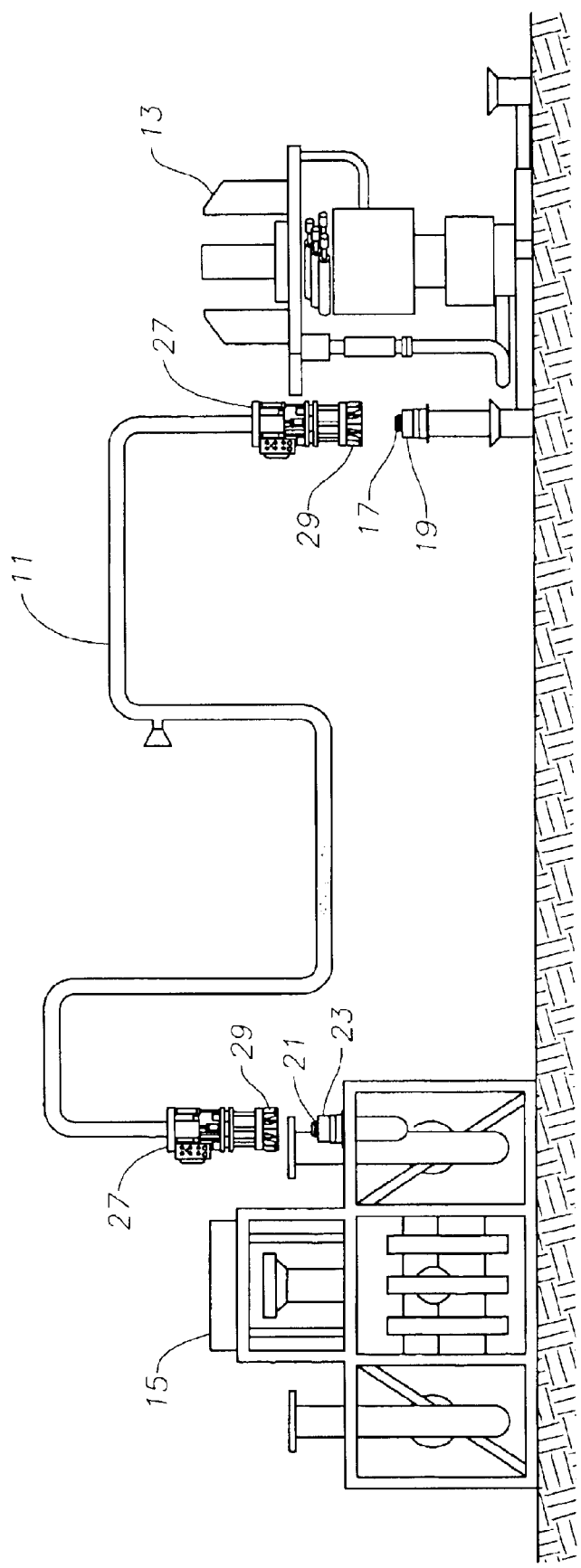
FIG. 1 is an elevational view of a jumper being connected to a tree assembly and a subsea manifold with a tool constructed in accordance with this invention on each end of the jumper.

As illustrated in FIG. 1, a jumper or flowline 11 extends between a pair of subsea assemblies 13 and 15. Typically assembly 13 is a tree assembly, and assembly 15 is a subsea manifold. A mandrel or tubular member 17 protrudes from a surface of a base structure 19 positioned on subsea tree assembly 13. Tubular member 17 and base structure 19 can be oriented vertically or horizontally. A similar tubular member 21 protrudes from a surface of a base structure 23 positioned on manifold 15. Flowline 11 connects to tree assembly 13 and manifold 15 so that tree assembly 13 is in fluid communication with manifold 15 for oil and gas to flow through.

Figure 2:
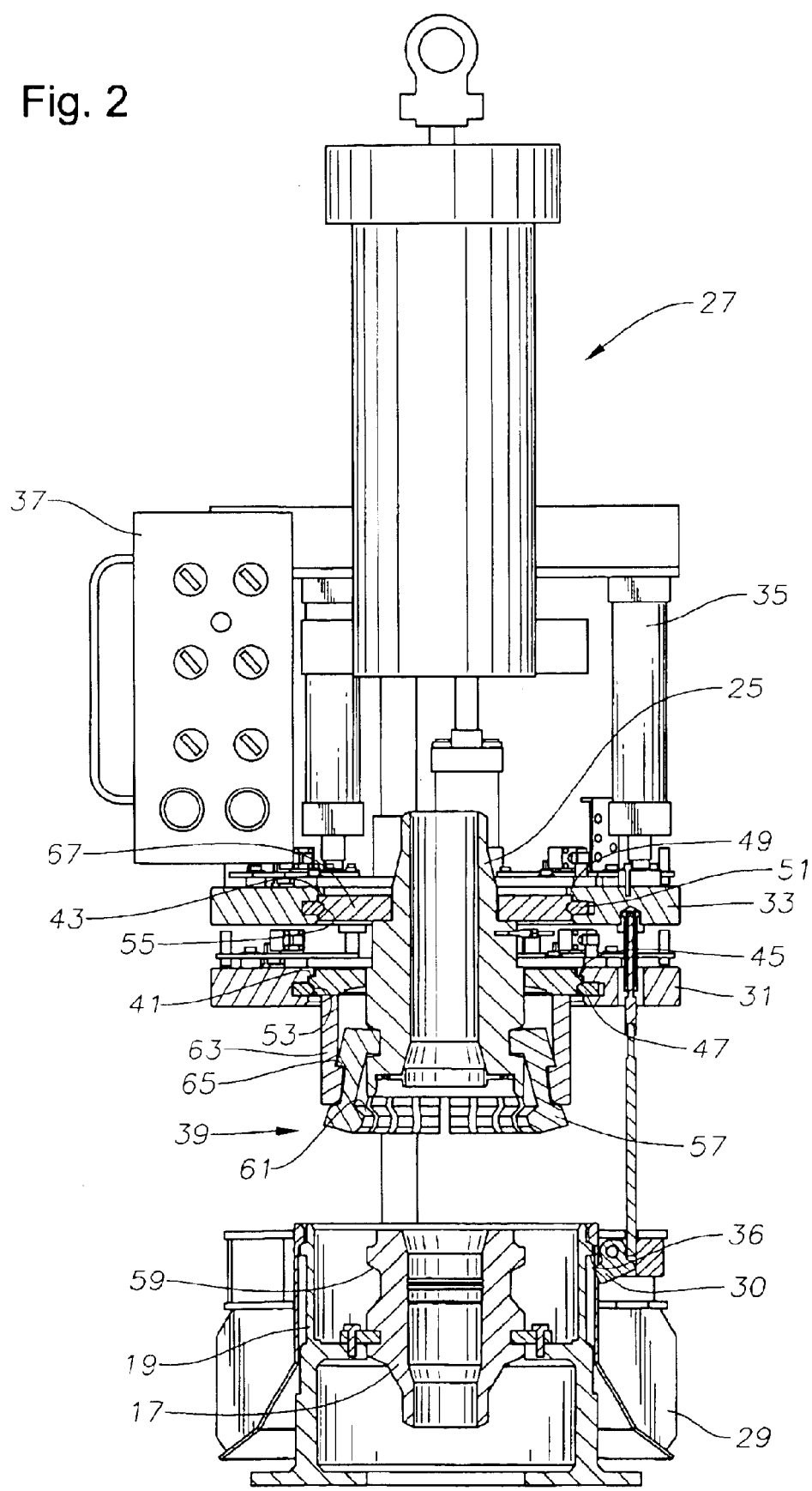
FIG. 2 is an enlarged sectional side view of one of the tools of FIG. 1 after it has landed on a base structure of one of the subsea assemblies of FIG. 1 with a flowline connector spaced above a tubular member on the base structure.
Figure 3:
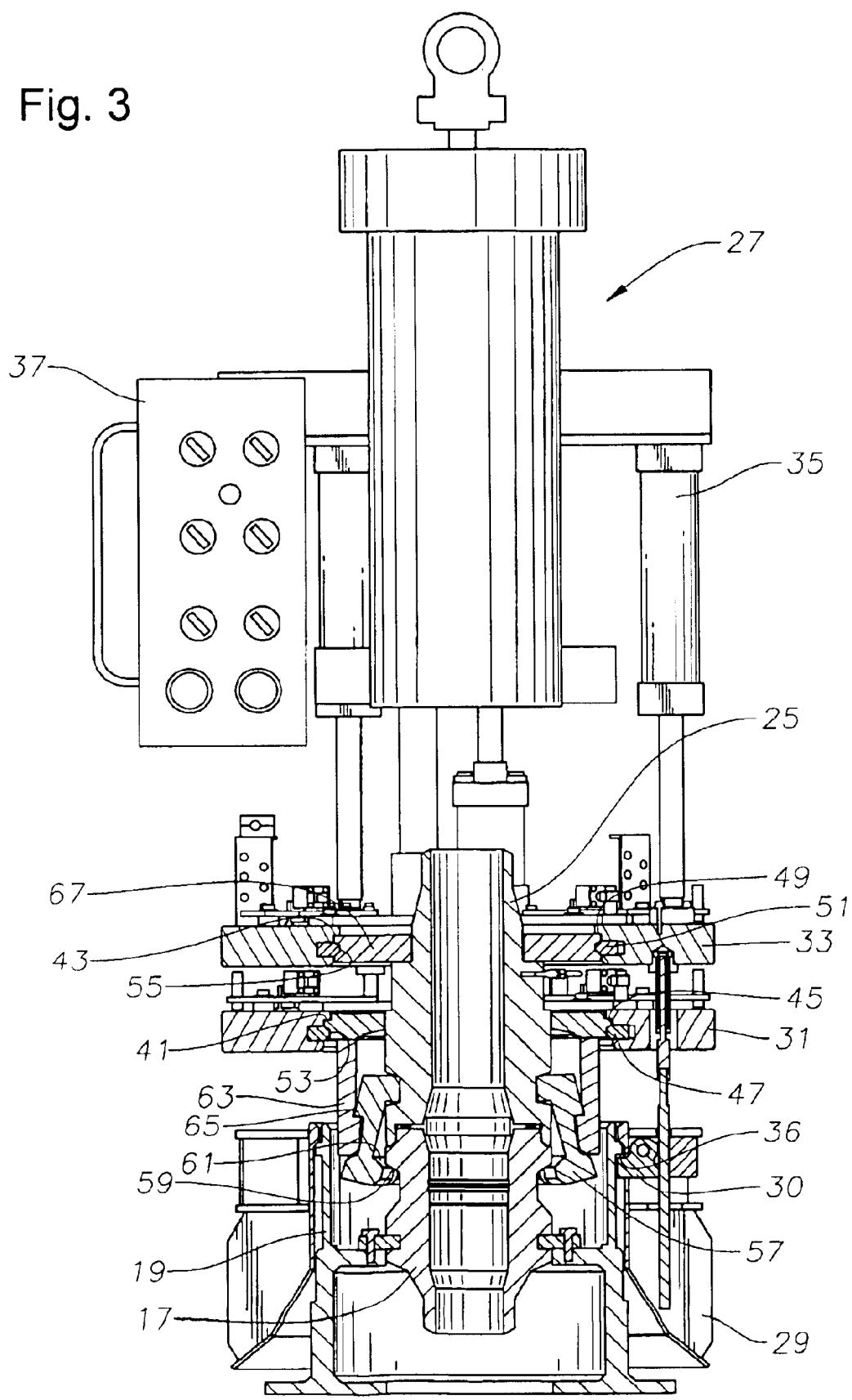
FIG. 3 is a progressive sectional view of the tool of FIG. 2 after the connector abuts the tubular member.
Figure 4:
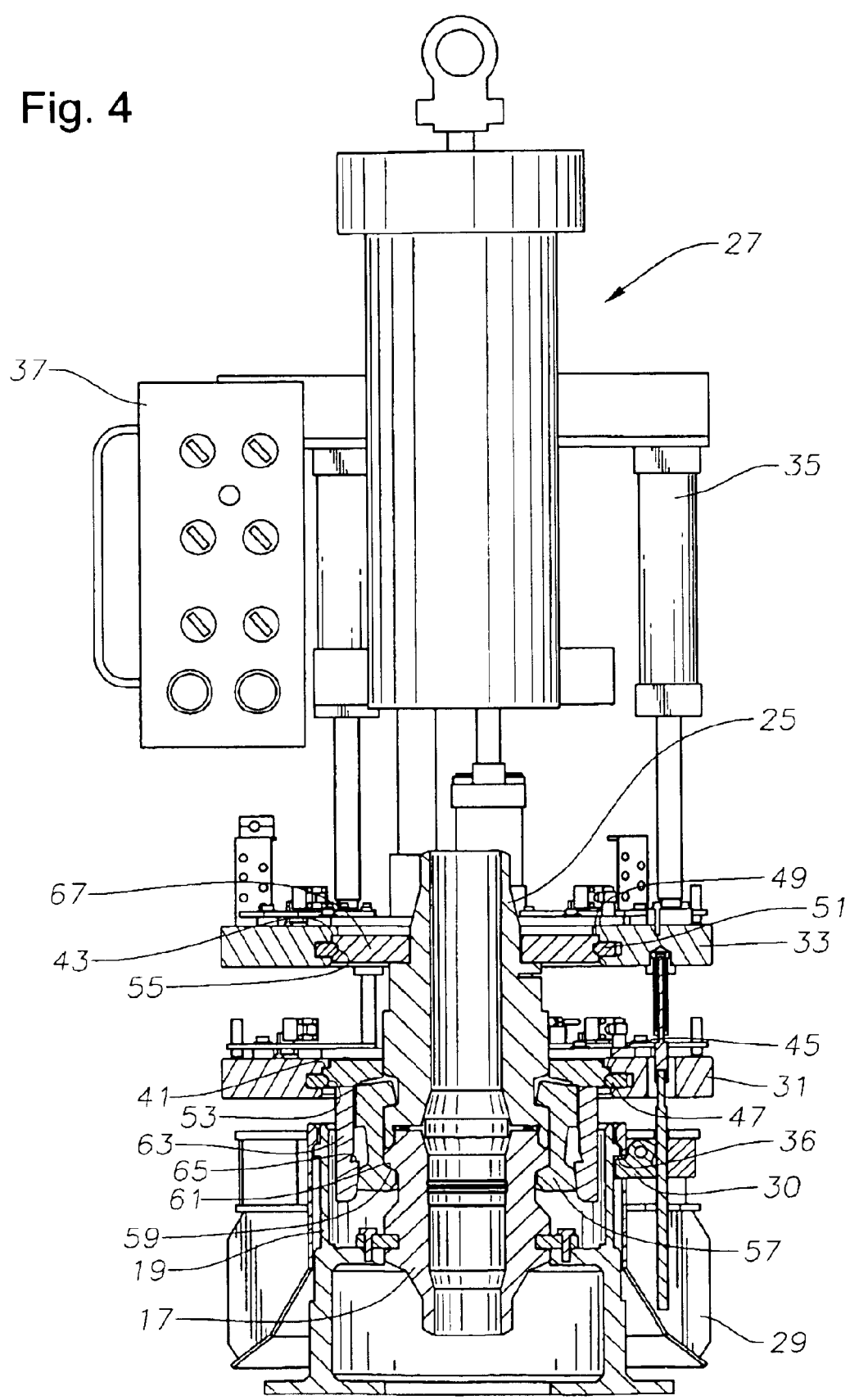
FIG. 4 is a progressive sectional view of the tool of FIG. 2 after the connector is locked to the tubular member.

Flowline 11 has a connector 25 (FIG. 2) located at each of its ends that connect flowline 11 to tree assembly 13 and manifold 15. A tool 27 connects each connector 25 to its respective tubular member 17 or 21. In the preferred embodiment, tool 27 is adapted to removeably attach to each connector 25 (FIG. 2) on the end portions of flowline 11. Referring to FIGS. 2–4, tool 27 has a landing base 29 with a base locking mechanism 30 that locks tool 27 to either base structure 19 or 23 (FIG. 1). Tool 27 has a first ring assembly 31 and a second ring assembly 33 which both engage the outer circumference of connector 25 on the ends of flowline 11. First ring assembly 31 is closer to landing base 29 than second ring assembly 33. First ring assembly 31 preferably has a larger inner circumference than second ring assembly 33. Actuators 35 are positioned around the circumference of tool 27 to lower connector 25 to abut with tubular members 17 or 21 (FIG. 1). Preferably, actuators 35 are hydraulic actuators, but they can also be jack screws. Actuators 35 also cause locking mechanism 30 to rotate radially inward and engage a base lip 36 located around the outer circumference of base structure 19, thereby locking tool 27 to base structure 19. A control panel 37 is positioned on the outer, upper or distal portion of tool 27 for a remote operated vehicle (ROV) to operate tool 27.

Figure 5:
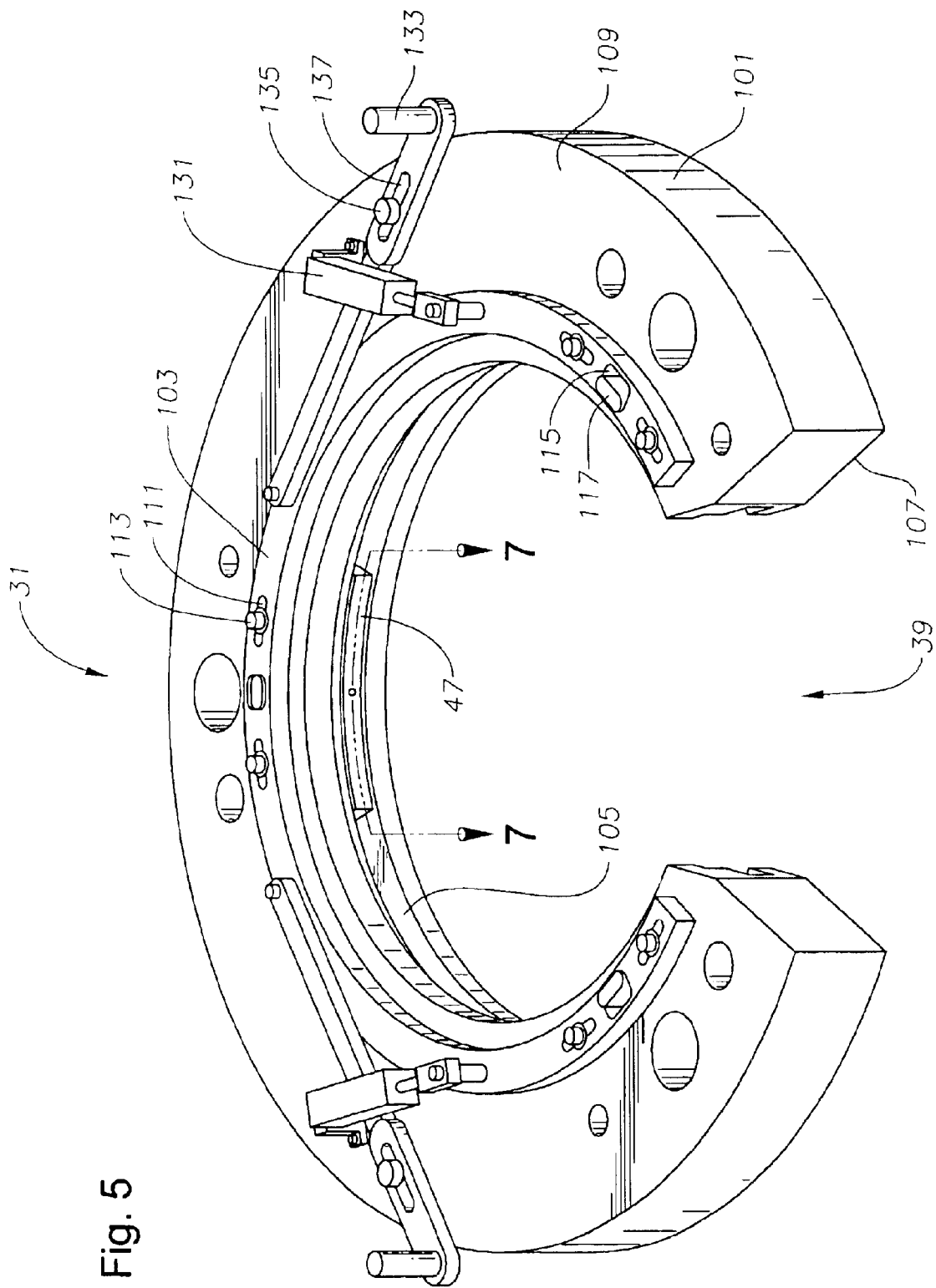
FIG. 5 is a perspective view of a ring assembly that is used part of the tool shown in FIG. 2 to hold the flowline connector.

An opening 39 runs axially along tool 27, which causes tool 27 to have a substantially semi-circular cross-section as best illustrated in FIG. 5. Opening 39 slides over the end potion of flowline 11 allowing tool 27 to attach and detach from flowline 11 as desired. After opening 39 slides over flowline 11, tool 27 is moved along flowline 11 towards its end to engage connector 25 at that end. The inner circumference of landing base 29 is preferably larger than the outer diameter of connector 25, which allows landing base 29 to slide over connector 29.

A first shoulder 41 and a second shoulder 43 are located around the circumference of connector 25. First shoulder 43 is farther away from landing base 29 than second shoulder 41. The circumference around first shoulder 41 is larger than the circumference around second shoulder 43. First ring assembly 31 preferably has a first ring lip 45 positioned along the inner circumference of first ring assembly 31 at a portion of ring assembly farthest away from landing base 29. First ring lip 45 engages first shoulder 41.

At least one first ring dog 47 is positioned along the inner surface of first ring assembly 31 closer to landing base 29 than first lip 45. Preferably, there are a plurality of first ring dogs 47 spaced around the inner circumference of first ring assembly 31. First ring dogs 47 move radially between an open position and a closed position. The inner circumference of first ring dogs 47 in the open position is greater than the inner circumference of first lip 45. The inner diameter of first ring dogs 47 in its open position is larger than the outer diameter of first shoulder 41 positioned on connector 25, which allows first ring assembly 31 to slide over connector 25 until first lip 45 engages first shoulder 41.

A second lip 49 is positioned along the inner circumference of second ring assembly 33 at the portion of second ring assembly farthest away from landing base 29. Second lip 49 has a smaller inner circumference than second shoulder 43, and second lip 49 engages second shoulder 43 on connector 25. At least one second ring dog 51 is positioned on the inner surface of second ring assembly 33 closer to landing base 29 than second lip 49. Preferably, there are a plurality of second rings dogs 51 spaced around the inner circumference of second ring assembly 33. Second ring dogs 51 move radially between an open position and a closed position. The inner circumference of second dogs 51 in their open position is greater than both the outer circumference of second shoulder 43 and the inner circumference of second lip 49, which allows second dogs 51 and a portion of second ring assembly 33 to slide over second shoulder 43 until second lip 49 engages second shoulder 43.

A first annular region 53 is located on the outer circumference of connector 25 closer to the end of connector 25 that abuts tubular members 17 or 21 than first shoulder 41. First ring dogs 47 engage connector 25 in annular region 53 when first ring dogs 47 are actuated to their closed position and first lip 45 is in contact first shoulder 41. First ring dogs 47 preferably cannot slide axially along connector 25 while engaged within first annular region 53. A second annular region 55 is located on the outer circumference of connector 25 closer to the end of connector 25 that abuts tubular member 17 or 21 than second shoulder 41. Second ring dogs 51 slide into second annular region 55 when actuated to their closed position after second lip 49 engages second shoulder 43. Second ring dogs 51 preferably cannot slide axially relative to connector 25 when in their closed position and within second annular region 55.

At least one latch dog 57 is positioned around the circumference of the end of connector 25 that abuts with either tubular member 17 or 21. Preferably there are a plurality of latch dogs 57 spaced around the circumference of connector 25. Latch dogs 57 pivot about the end of connector 25 that abuts tubular member 17 or 21. A portion of latch dogs 57 extend beyond the end of connector 25 that abuts with tubular member 17 or 21. The portion of latch dogs 57 extending beyond connector move radially inward and outward as latch dogs 57 rotate as they are actuated.

A tubular lip 59 is positioned around the circumference of both tubular members 17 and 21 adjacent to the end of tubular members 17 and 21, which is abutted by each connector 25. Each tubular lip 59 protrudes from the outer surface of each tubular member 17 and 21. A shoulder 61 is located on the portion of each of latch dog 57 extending beyond connector 25. Shoulder 61 engages the side of tubular lip 59 furthest away from the end of tubular member 17 or 21 that is abutted by connector 25 as shown in FIG. 4. Connector 25 is locked to either tubular member 17 or 21 when latch dogs 57 are actuated and pivot shoulder 61 radially inward to engage the side of tubular lip 59 farthest away from connector 25.

An actuation sleeve 63 positioned around an inner portion of connector 25 forms an outer portion of connector 25 and slides axially along an inner portion of connector 25 to actuate latch dogs 57 as shown in FIGS. 3–4. First shoulder 41 and first annular region 53 are preferably positioned on actuation sleeve 63. Actuation sleeve 63 is a tubular member that receives latch dogs 57 as it slides in contact along the inner portion of connector 25. When actuation sleeve 63 is moved towards tubular member 17 or 21, the end of actuation sleeve 63 extending towards tubular member 17 or 21 slidingly engages the outer surface of latch dogs 57, which causes latch dogs 57 to pivot radially inward to lock latch dogs 57 to tubular member 17 or 21 as illustrated in FIG. 4. The portion of latch dogs 57 extending away from flowline 11 are pivoted radially inward after actuation sleeve 63 slides towards tubular member 17 or 21 defines the locked connector 25 position. An actuation lip 65 is formed around the inner circumference of actuation sleeve 63. Actuation lip 65 engages the outer surface of a portion of latch dogs 57 away from tubular member 17 or 21 when actuation sleeve 63 is moved towards flowline 11, causing the portion of latch dogs 57 extending towards tubular member 17 or 21 to pivot radially outward. Referring to FIGS. 2 and 3, connector 25 is in an unlocked position, which is defined by the portion of latch dogs 57 extending away from flowline 11 being rotated radially outward with actuation sleeve 63 engaging the portion of latch dogs 57 extending toward flowline 11.

When first ring dogs 47 are in their locked position, actuation sleeve 63 slides relative to the inner portion of connector 25 as first ring assembly 31 moves towards or away from landing base 29. Accordingly the movement of first ring assembly 31 actuates latch dogs 57 through actuation sleeve.

A member 67 is fixedly attached to the inner portion of connector 25 farther from landing base 29 than first shoulder 41. Member 67 can have a substantially disc-like shape. The outer circumference of member 67 is less than the inner circumference of first lip 45, so the entire first ring assembly 31 can slide over member 67 to engage first shoulder 41. Member 67 is preferably the portion of connector 25 that second ring assembly 33 engages. In the preferred embodiment, second shoulder 43 and second annular region 55 are positioned around the outer circumference of member 67. Accordingly, the outer circumference of member 67 is less than the inner circumference around second ring dogs 51 when they are in their open position, but larger than the inner circumference of second lip 49. As shown in FIGS. 2 and 3, the inner portion of connector 25 moves in unison with second ring assembly 33 when second ring dogs 51 are in their closed position engaging second annular region 55 because member 67 is fixedly attached to the inner portion of connector 25.

Figure 6:
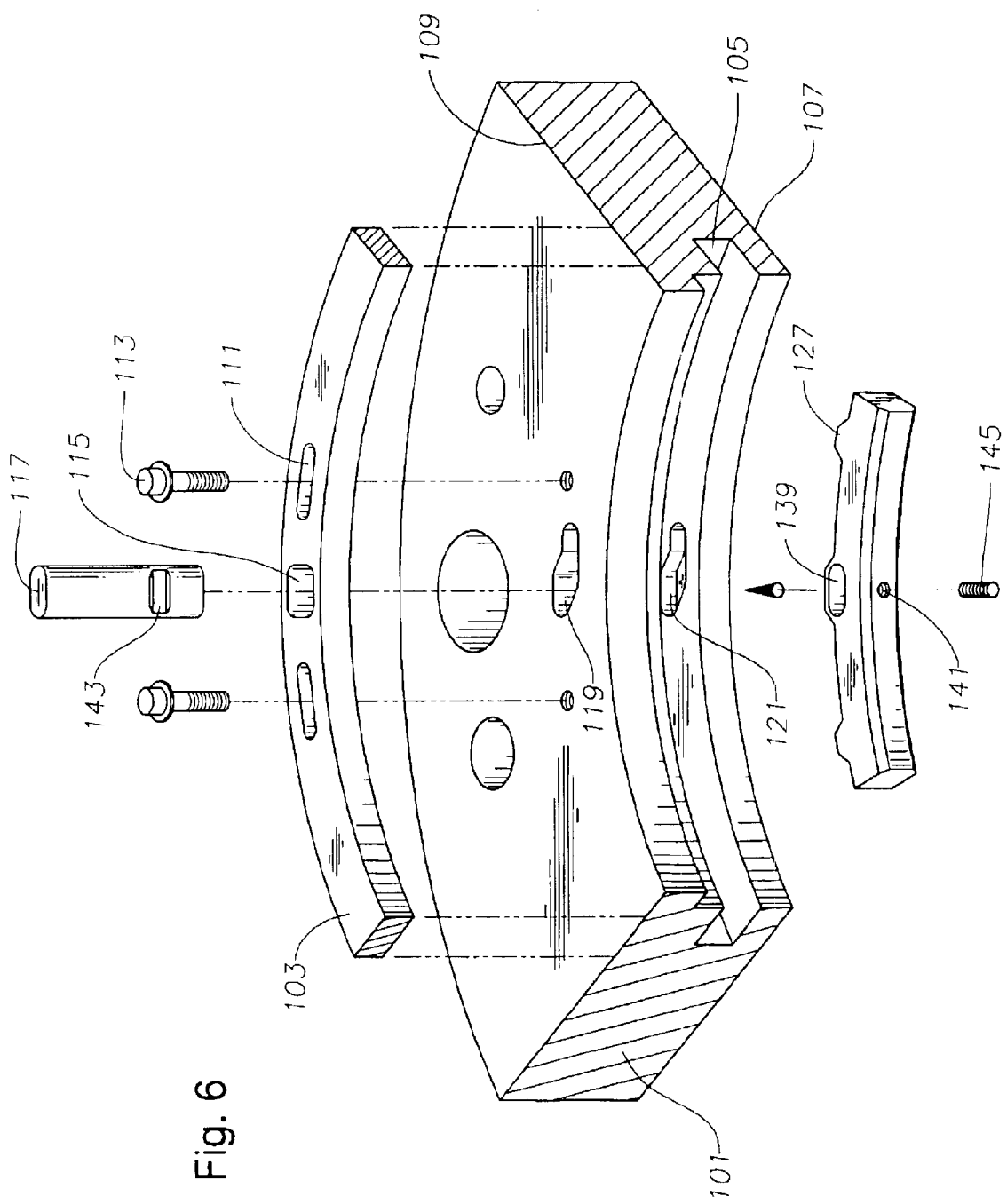
FIG. 6 is an exploded enlarged view of a portion of the ring assembly shown in FIG. 5.

Ring assemblies 31 and 33 are shown in more detail in FIGS. 5 and 6. Each ring assembly includes a cam ring 101 and a cam follower ring 103. In the embodiment shown, cam ring 101 is the stationary ring and cam follower ring 103 moves relative to cam ring 101. Alternatively cam ring 101 could move while cam follower ring 103 remains stationary. Another alternative can also be that both cam ring 101 and cam follower ring 103 are moveable relative to each other. Cam ring 101 preferably has an annular cam region 105 which is where dogs 47 or 51 are positioned. Cam ring 101 has a base section 107 and a top section 109. When ring assemblies 31 and 33 are positioned in tool 27 (FIGS. 1–4), base section 107 is the portion of cam ring 101 facing landing base 29.

Cam follower ring 103 is positioned on top section 109 of cam ring 101 and slidingly engages top section 109. Cam follower ring 103 has a plurality of fastener openings 111 spaced along its upper surface. Preferably, fastener openings 111 are elliptical in shape to allow cam follower ring 103 to slidingly engage cam ring 101 after being attached. A threaded fastener 113 is received through each fastener opening 111 to attach cam follower ring 103 to cam ring 101. Threaded fasteners 113 preferably hold cam follower ring 103 against cam ring 101 while allowing cam follower ring 103 to slidingly engage top section 109 of cam ring 101.

An elongated opening 115 is formed in cam follower ring 103 for a pin or follower 117 to pass therethrough. Preferably, there is an elongated opening 115 and a follower 117 for each of dogs 47 and 51. In the preferred embodiment, elongated opening 115 is formed so that follower 117 cannot move circumferentially relative to cam follower ring 103 but can move radially inward and outward relative to cam follower ring 103 while positioned within elongated opening 115. Referring to FIG. 6, a cam slot 119 is formed in cam ring 101 from top section 109 to annular cam region 105. Preferably there is a cam slot 119 for each follower 117. Follower 117 passes through cam slot 119 from cam follower ring 103 and into annular cam region 105. Cam slot 119 is formed to allow follower 117 to move circumferentially with cam follower ring 103, and forces follower 117 to move radially inward and outward as it moves circumferentially relative to cam ring 101. Preferably, a guide slot 121 is formed in the portion of cam ring 101 opposite from cam slot 119 for follower 117 to rest in after passing through annular cam region 105. Guide slot 121 typically does not open to base 107.

Figure 7A:
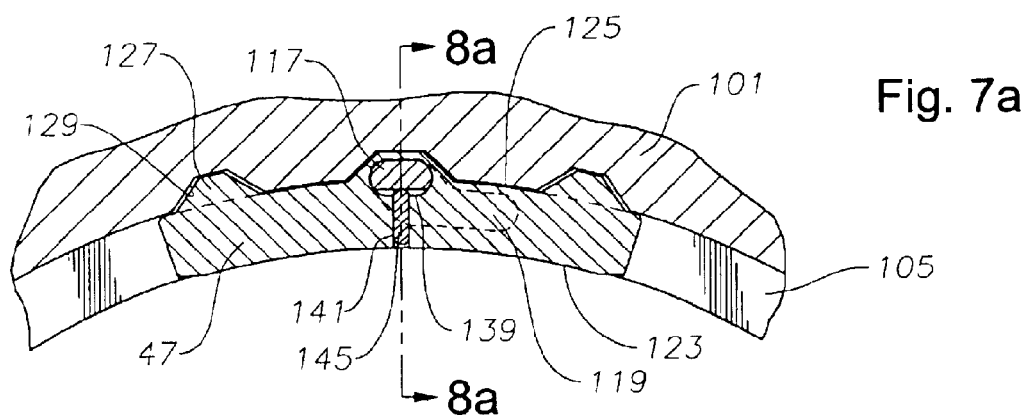
FIG. 7a is an enlarged cross-section view of the ring assembly of FIG. 5 taken along the line 7—7 of FIG. 5 and with a dog in its open position.
Figure 7B:
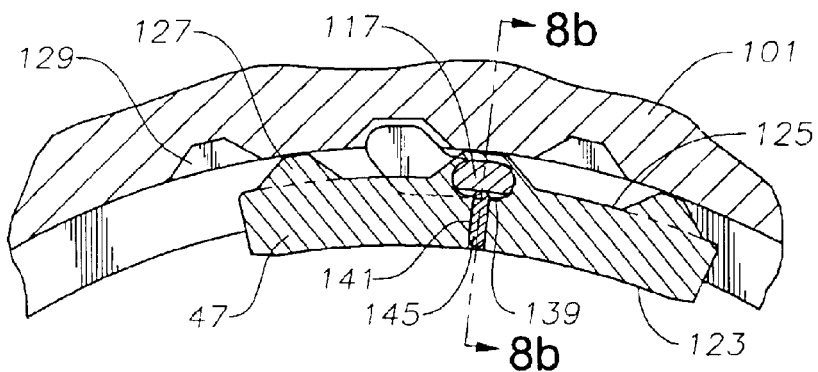
FIG. 7b is an enlarged cross-section view of the ring assembly as shown in FIG. 7a, but with the dog in its closed position.
Figure 8A:
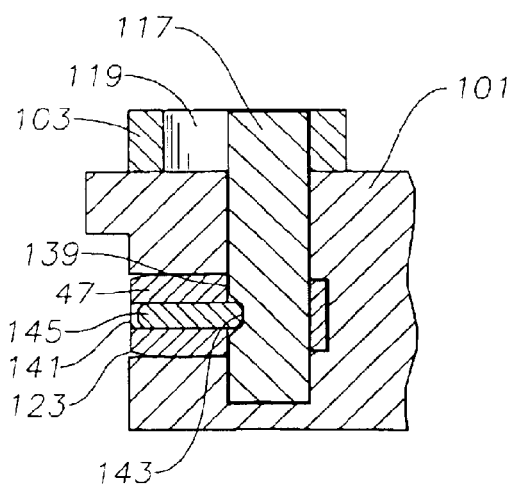
Figure 8B:
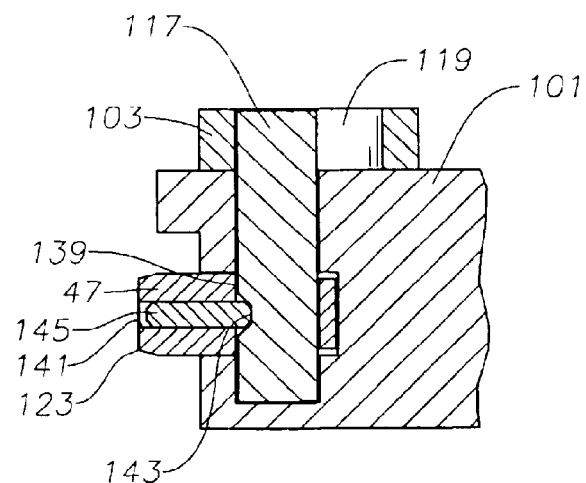
FIG. 8b is an enlarged cross-section view of the ring assembly of FIG. 7b taken along line 8b—8b of FIG. 7b.

As illustrated in FIGS. 7a and 7b, dogs 47 and 51 are preferably arc-shaped so that dogs 47 or 51 matingly fit within annular cam region 105. Dogs 47 and 51 have an inner circumference surface 123 and an outer circumference surface 125. When the plurality of dogs 47 or 51 are in their open position as shown in FIGS. 7a and 8a, their outer circumference surface 125 matingly fits with the inner circumference of annular cam region 105, and inner circumference surface 123 is substantially flush with the portion of the inner circumference of cam ring 101 adjacent to each dog 47 or 51. Outer circumference surface 125 slidingly engages the inner circumference of annular cam region 105 as each dog 47 or 51 moves with their respective follower 117.

A follower passageway 139 extends axially through each dog 47 and 51 for receiving cam follower 117. Passageway 139 is formed so that dogs 47 or 51 cannot move radially or circumferentially relative to follower 117. A bore 141 extends from inner circumference surface 123 to passageway 139. A fastener slot 143 (FIGS. 6–8b) is formed on the surface of each follower 117 that aligns with bore 141. Preferably, bore 141 is threaded. A threaded fastener 145 engages bore 141 and passes therethrough to engage fastener slot 143 on follower 117, which preferably prevents follower 117 from sliding axially out of passageway 139 until fastener 145 is removed.

Actuating protuberances 127 (FIGS. 6–7b) are positioned on outer circumference surface 125. Protuberances 127 also slidingly engage the inner circumference of annular cam region 105 when each dog 47 or 51 slides along cam ring 101. As shown in FIGS. 7a and 7b, a plurality of recesses 129 are formed along the inner circumference of annular cam region 105 to receive actuating protuberances 127 when dogs 47 or 51 are in their open position.

Actuating protuberances 127 are formed so that they remain in substantial contact with the inner surface of annular cam region 105 as dogs move radially and circumferentially with follower 117, which is guided by cam slot 119 (FIGS. 5 and 6). As shown in FIG. 7a, preferably actuating protuberances 127 are in substantial contact with recesses 129, and outer circumference surface 125 is in substantial contact with the inner surface of annular cam region 105 when dogs 47 or 51 are in their open position. After being moved radially inward and along the inner circumference of annular cam region 105 to the position shown in FIG. 7b, only actuating protuberances 127 contact the inner surface of annular cam region 105, which is the position of dogs 47 or 51 when they are in their closed position. Preferably a gap forms between outer circumference surface 125 and the inner surface of annular cam region 105. In the closed position, radial forces communicate from connector 25 through either dogs 47 or 51, through actuating protuberances 127 to annular cam region 105 of cam ring 101. Hydraulic pressure is not needed to hold dogs in their closed position, and there is no need for a mechanical back-up incase of hydraulic failure in holding dogs 47 or 51 in their closed position.

Referring to FIG. 5, dogs 47 or 51 are actuated by follower 117, which follows cam follower ring 103. Typically, a hydraulic actuator 131 or a handle 133 can move cam follower ring 103 relative to cam ring 101. In the preferred embodiment, hydraulic actuator 131 preferably actuates dogs 47 or 51 between their open and closed positions, with handle 133 being used by the ROV in case of hydraulic failure. It is noteworthy to mention, dogs 47 or 51 remain in their closed position even after a hydraulic failure of hydraulic actuators 131. Such a failure preferably only means that the ROV must use handles 133 to actuate dogs 47 or 51 to their open position. Hydraulic actuators 131 are typically fixedly positioned along top section 109 and connect to cam follower ring 103. In the preferred embodiment, hydraulic actuators 131 are pistons that are moved through hydraulic pressure. Handles 133 are slidingly mounted to top section 109 of cam ring 101 and connect to cam follower ring 103. A handle pin 135 protruding from top section 109 passes through a handle slot 137 in handle 131. Handle slot 137 slides along handle pin 135 to guide the movement of each handle 133 relative to cam ring 101.

In operation, tree assembly 13 and manifold 15 are typically already landed and installed on the sea floor. On a vessel (not shown) above, the operator slides opening 39 of tool 27 over flowline 11 with landing base 29 oriented towards the connector 25 that tool 29 is going to be attached. First and second ring dogs 47 and 51 are in their open position within first and second ring assemblies 31 and 33. The operator slides tool 27 along flowline 11 towards connector 25 until first lip 45 contacts first shoulder 41 and second lip 49 contacts second shoulder 43. Either hydraulic pressure is supplied to hydraulic actuators 131, or handles 133 are manually actuated to move first ring dogs 47 and second ring dogs 51 to their closed positions, thereby engaging first and second annular regions 53 and 55. This causes cam follower ring 103 to rotate relative to cam ring 101. Cam followers 117 move along cam slots 119 and 121 (FIG. 6), causing ring dogs 47 to extend. The operator then repeats this process for tool 27 that is to be attached to connector 25 on the opposite end of flowline 11.

In the preferred embodiment, the operator then lowers flowline 11, connectors 25, and tool 27 as a unit down to tree assembly 13 and manifold 15. Typically, a harness system (not shown) is used so that tools 27 align with base structure 19 on tree assembly 13 and base structure 23 on manifold 15 when lowered. If future alignment is necessary, the ROV moves tool 27 as needed. If base structures 19 and 23 are vertically oriented, then flowline 11, connectors 25, and tools 27 are lowered so that each landing base 29 engages base structures 19 and 23. If base structures 19 and 23 are horizontally oriented, then flowline 11, connectors 25 and tools 27 are lowered between base structures 19 and 23 and the ROV moves each tool 27 so that their landing bases 29 are engaging their respective base structure 19 or 23. At this point, connectors 25 have been "hard landed" to base structures 19 and 23 as shown in FIG. 2.

In the preferred embodiment, after tool 27 is landed on tree base structure 19, the ROV then turns on the hydraulic pressure from a hydraulic supply (not shown) using controls on control panel 37 on one of tools 27 to engage actuators 35. Actuators 35 move the upper portion of tool 27 towards base structure 19, which causes locking members 30 to rotate radially inward and engage base lip 36, thereby securing tool 27 to base structure 19 with connector 25 positioned away from tubular member 17.

ROV continues to supply hydraulic pressure to actuators 35 to lower first and second ring assemblies 31 and 33, which are carrying connector 25, towards tubular member 17. When connector 25 abuts with tubular member 17, then connector 25 has been "soft-landed," with a portion of latch dogs 59 extending beyond the interface of connector 25 and tubular member 17 as shown in FIG. 3. At this point, connector 25 is abutted with tubular member 17. Member 67 is fixedly attached to the inner portion of connector 25, so member 67 preferably cannot continue to approach tubular member 17. As actuators 35 continue to receive hydraulic pressure, second ring assembly 33 cannot continue to approach tubular member 17 because second dogs 51 are engaging second annular region 55, which is located on member 67. First dogs 47 of first ring assembly 31 are engaging first annular region 53 located on actuation sleeve 63. As hydraulic pressure is supplied to actuators 35, first ring assembly 31 can continue moving towards tubular member 17 because actuation sleeve 63 can slide relative to the inner portion of connector 25.

The movement of first ring assembly 31 towards tubular member 17 forces actuation sleeve 63 to pivot the portion of latch dogs 59 extending beyond the interface of connector 25 and tubular member 17 as actuation sleeve 63 slides axially along the inner portion of connector 25. Actuation sleeve 63 rotates latch dogs 59 until latch dog shoulder 61 engages actuation lip 65 on tubular member 17. After shoulder 61 engages lip 65, connector 25 is landed and locked to tubular member 17 in the position shown in FIG. 4. The ROV then turns off the supply of hydraulic pressure to actuators 35, and repeats this process on tool 27 to attach connector 25 on the opposite end of flowline 11 to tubular member 21 on manifold 15.

The operator can leave tools 27 attached to connectors 25 and base structures 19 and 23 until the flowline is disconnected, or the operator can remove tools 27 for connecting other flowlines to other subsea structures. The operator may also leave tools 27 subsea, and then use them to disconnect flowline 11 from tree assembly 13 or manifold 15 for maintenance or repairs to be performed. In operation, the removal of either of tools 27 from tubular members 17 or 21 is as follows.

The ROV operates controls on control panel 37 to supply hydraulic pressure from a supply (not shown) to hydraulic actuators 131. In the event that hydraulic actuators are not working, the ROV would move handles 133. Hydraulic actuators 131 for first and second ring assembly moves each cam follower ring 103 relative to each cam ring 101. The movement of cam follower ring 103 forces follower 117 to slide circumferentially with cam follower ring 103 and cam slot 119. The movement of cam follower ring also forces follower 117 to slide along cam slot 119 from a radially inward position to a radially outward position. Dogs 47 and 51 move in unison with follower 117, so they also move circumferentially and radially outward due to the movement of cam follower ring 103 to their open position. The ROV stops the supply of hydraulic pressure to hydraulic actuators 131.

Dogs 47 and 51 preferably do not engage connector 25 while in their open position. Therefore, actuators 35 can raise first and second ring assemblies 31 and 33 without unlocking and without moving connector 25 from tubular member 17. The ROV supplies hydraulic pressure to actuators 35 to raise first and second ring assemblies and disengage locking mechanism 30 from base lip 28. The ROV stops the supply of hydraulic pressure to actuators 35. The operator can remove tool 27 from base structure 23 and slide tool 27 away from flowline 11 through opening 39. The operator can then raise tool 27 to the surface and attach tool 27 to another flowline 11. The removal process can then be repeated to remove tool 27 at the other end of flowline 11 from connector 25 that is locked to tubular member 21, and from base structure 23.

Unlike prior ring assemblies that used hydraulic pressure to hold the ring dogs in their closed position that required mechanical back-ups, in this invention the radial forces from the inner circumference of dog 47 and 51 transferred through dogs 47 and 51, through protuberances 127 and are absorbed by each cam ring 101. No hydraulic pressure is needed to keep dogs 47 and 51 in their closed position, and there is no need for a mechanical back-up because each cam ring 101 is a physical barrier to outward movement of each of dogs 47 and 51.

While the invention has been shown in only one of its forms, it should be apparent to those skilled in the art that it is not so limited, but is susceptible to various changes without departing from the scope of the invention. For example, rather than using hydraulic actuators for actuators 35, rotating jack screws could be implemented to raise and lower the frame

We claim:

1. An assembly for connecting a first member to a second member, comprising:
   a cam ring adapted to be carried by the first member;
   at least one cam slot with a radial outer portion and a radial inner portion;
   a cam follower that slidingly engages the slot;
   a dog that moves radially in unison with the cam follower; and
   a cam follower ring that engages the cam follower, the cam follower ring and the cam ring being incrementally rotatable relative to each other to cause the cam follower to move in the cam slot from the radial outer portion to the radial inner portion, thereby pushing dog to an inner gripping position, the dogs adapted to engage the second member while in the inner gripping position.

2. The assembly of claim 1, wherein the cam follower ring is moved while the cam ring is stationary relative to the assembly.

3. The assembly of claim 1, wherein the cam ring has first and second parallel surfaces, defining a circumferential groove between them; and wherein the dog is camed in the grooves.

4. The assembly of claim 1, wherein the cam ring has first and second parallel surfaces defining a circumferential groove between them;
   the dog is carried in the groove;
   each of the first and second surfaces has one of the slots; and
   the cam follower comprises a pin extending through each of the slots and a hole in the dog.

5. The assembly of claim 1, wherein there are a plurality of the dogs spaced around the inner circumference of the cam ring.

6. The assembly of claim 1, wherein the each dog has at least one protuberance formed on an outer circumference of the dog that slidingly engages an inner circumference of the cam ring.

7. The assembly of claim 1, wherein the cam ring has an inner circumference with at least one recess; and the dog has an outer circumference with a protuberance engaging the recess while the dog is in a radial outer position, and engaging the inner circumference of the cam ring while the dog is in the inner gripping position.

8. The assembly of claim 1, wherein the cam ring has first and second parallel surfaces, defining a circumferential groove between them; and wherein the dog is camed in the grooves; and wherein the cam follower ring is located in sliding contact with the first surface of cam ring.

9. The assembly of claim 1, further comprising a hydraulic actuator secured to the cam ring that rotates the cam follower ring relative to the cam ring in order to move the dog to and from its inner gripping position.

10. The assembly of claim 1, further comprising a handle secured to the cam ring that rotates the cam follower ring relative to the cam ring in order to move the dog to and from its inner gripping position.

11. The assembly of claim 1, further comprising an ROV powered hydraulic actuator secured to the cam ring that rotates the cam follower ring relative to the cam ring in order to move the dog to and from its inner gripping position.

12. The assembly of claim 1, further comprising a handle secured to the cam ring which is adapted to be powered by an ROV, that rotates the cam follower ring relative to the cam ring in order to move the dog to and from its inner gripping position.

13. An assembly for connecting a first member to a second member, comprising:
   a cam ring adapted to be carried by the first member, having first and second parallel surfaces defining a circumferential groove between them;
   a plurality of cam slots, each with a radial outer portion and a radial inner portion formed in each of the first and second surfaces;
   at least one recess located in the groove along the inner circumference of the cam ring;
   a plurality of cam followers, each follower slidingly engages one of the cam slots, comprising of a pin extending through each of the slots;
   a plurality of the dogs spaced around the inner circumference of the cam ring in the groove, each dog having a hole that receives one of the cam followers so that the dogs move radially within the groove in unison with the cam followers;
   a cam follower ring located in sliding contact with the first surface of cam ring, the cam follower ring being incrementally rotatable relative to the cam ring to cause the cam followers to move in the cam slots from the radial outer portion to the radial inner portion, thereby pushing the dogs to an inner gripping position, the dogs adapted to engage the second member while in the inner gripping position; and at least one protuberance on an outer circumference of each dog, engaging the recess while the dog is in a radial outer position, and engaging the inner circumference of the cam ring while the dog is in the inner gripping position.

14. The assembly of claim 13, further comprising an ROV powered hydraulic actuator secured to the cam ring that rotates the cam follower ring relative to the cam ring in order to move the dog to and from its inner gripping position.

15. The assembly of claim 13, further comprising a handle secured to the cam ring which is adapted to be powered by an ROV, that rotates the cam follower ring relative to the cam ring in order to move the dog to and from its inner gripping position.

16. An apparatus for connecting a flowline to a tubular member, comprising:
 a frame;
 a upper ring assembly carried by the frame;
 a lower ring assembly also carried by the frame;
 a connector adapted to be secured to the tubular member and having a locking element on its lower end;
 a locking element actuator extending upward from the locking element;
 the upper ring assembly engaging the connector and the lower ring assembly engaging the actuator, and linear actuators move the connector downward into engagement with the tubular member and move the actuator downward to secure the locking element to the tubular member;
 each of the ring assemblies comprising:
  a cam ring adapted to be carried by frame;
  a plurality of cam slots, each having a radial outer portion and a radial inner portion;
  a plurality of cam followers that slidingly engage the cam slots;
  a plurality of dogs that move radially in unison with the cam followers; and
  a cam follower ring that engages the cam followers, the cam follower ring and the cam ring being incrementally rotatable relative to each other to cause the cam followers to move in the cam slots from the radial outer portion to the radial inner portion, thereby pushing each dog to an inner gripping position, the dogs adapted to engage the second member while in the inner gripping position.

17. The assembly of claim 16, wherein the cam ring has an inner circumference with at least one recess; and each dog has an outer circumference with a protuberance engaging the recess while the dogs are in a radial outer position, and engaging the inner circumference of the cam ring while the dogs are in the inner gripping positions.

18. The assembly of claim 16, further comprising a hydraulic actuator secured to the cam ring that rotates the cam follower ring relative to the cam ring in order to move the dogs to and from the inner gripping positions.

19. The assembly of claim 16, wherein the cam ring has first and second parallel surfaces defining a circumferential groove between them;
 the dogs are carried in the groove;
 each of the first and second surfaces has the cam slots; and
 each of the cam followers comprises a pin extending through each of the slots and a hole in the dog.

20. A method for connecting a tool having a first member to a second member, comprising the following steps:
 (a) placing the second member within the circumference of the first member having a cam ring and at least one dog; and then
 (b) engaging the at least one dog to the outer circumference of the second member by sliding at least one dog circumferentially along an inner surface of the cam ring from an outer radial position to an inner radial position.

21. The method of claim 20 wherein the at least one dog is slid by sliding a cam follower ring engaging the at least one dog relative to the cam ring.

* * * * *